US011232574B2

(12) United States Patent
Koh et al.

(10) Patent No.: US 11,232,574 B2
(45) Date of Patent: Jan. 25, 2022

(54) DISTRIBUTED OBJECT TRACKING SYSTEM

(71) Applicant: GORILLA TECHNOLOGY INC., Taipei (TW)

(72) Inventors: Sih-Ping Koh, Taipei (TW); Nuo Pai Hsu, Taipei (TW)

(73) Assignee: GORILLA TECHNOLOGY INC., Taipei (TW)

( * ) Notice: Subject to any disclaimer, the term of this patent is extended or adjusted under 35 U.S.C. 154(b) by 259 days.

(21) Appl. No.: 16/401,115

(22) Filed: May 2, 2019

(65) Prior Publication Data

US 2019/0340767 A1 Nov. 7, 2019

(30) Foreign Application Priority Data

May 4, 2018 (TW) ................... 107115293

(51) Int. Cl.
*G06T 7/20* (2017.01)
*G06K 9/00* (2006.01)
*G06K 9/32* (2006.01)

(52) U.S. Cl.
CPC ............ *G06T 7/20* (2013.01); *G06K 9/00201* (2013.01); *G06K 9/00221* (2013.01); *G06K 9/00671* (2013.01); *G06K 9/3241* (2013.01)

(58) Field of Classification Search
CPC ............ G06T 7/20; G06T 2207/30232; G06T 2207/30241; G06T 2207/30196; G06T 7/292; G06T 7/70; G06T 2207/20021; G06T 2207/10021; G06T 2207/30236; G06T 2207/30221; G06T 2207/30242; G06K 9/00201; G06K 9/00221; G06K 9/00771; G06K 9/00671; G06K 9/00369; G06K 9/3241; G06K 9/00342; G06K 9/00335; G06K 9/00362; G06K 9/00785; G06K 2009/00738; G06K 2009/3291; G06K 2209/21; H04N 7/181; H04N 5/247; H04N 13/371; H04N 5/144
See application file for complete search history.

(56) References Cited

U.S. PATENT DOCUMENTS 6,335,754 B1 * 1/2002 Endo ....................... G01C 11/02
 348/36
6,359,647 B1 * 3/2002 Sengupta ......... G08B 13/19608
 348/154
6,437,819 B1 * 8/2002 Loveland ............... H04N 7/181
 348/143
7,242,423 B2 * 7/2007 Lin ................... G08B 13/19645
 348/169
7,450,735 B1 * 11/2008 Shah ...................... G06T 7/292
 348/143

(Continued)

*Primary Examiner* — Manav Seth
(74) *Attorney, Agent, or Firm* — Min-Lee Teng; Litron Patent & Trademark Office

(57) ABSTRACT

A distributed object tracking system includes a plurality of image analysis devices and a cluster management service device connected to the plurality of image analysis devices, wherein each image analysis device analyzes an object in a corresponding real-time video stream to generate an analysis result for tracking the object, and the cluster management service device includes a tracking module to form a trajectory of the object according to the analysis result generated by each of the plurality of image analysis devices.

13 Claims, 4 Drawing Sheets

(56) References Cited

U.S. PATENT DOCUMENTS

| | | | | |
|---|---|---|---|---|
| 7,683,929 B2* | 3/2010 | Elazar | | G06T 7/254 |
| | | | | 348/169 |
| 7,840,130 B2* | 11/2010 | Kucharyson | | H04N 7/181 |
| | | | | 396/56 |
| 8,218,011 B2* | 7/2012 | Cheng | | G08B 13/19645 |
| | | | | 348/159 |
| 8,284,026 B2* | 10/2012 | Ivanov | | G08B 5/22 |
| | | | | 340/6.1 |
| 8,493,409 B2* | 7/2013 | Cobb | | G06T 7/194 |
| | | | | 345/629 |
| 8,570,376 B1* | 10/2013 | Sharma | | G06K 9/00771 |
| | | | | 348/159 |
| 8,698,895 B2* | 4/2014 | Nerayoff | | G08G 1/017 |
| | | | | 348/148 |
| 9,008,361 B2* | 4/2015 | Gottschlag | | G06T 19/20 |
| | | | | 382/103 |
| 9,087,386 B2* | 7/2015 | Morris | | G08B 13/19608 |
| 9,129,157 B2* | 9/2015 | Chao | | G06T 7/80 |
| 9,241,138 B2* | 1/2016 | Yoneji | | H04N 7/181 |
| 9,269,243 B2* | 2/2016 | Shet | | G06F 16/73 |
| 9,336,451 B2* | 5/2016 | Boghossian | | G08B 13/19645 |
| 9,363,489 B2* | 6/2016 | Boghossian | | G06K 9/3241 |
| 9,396,385 B2* | 7/2016 | Bentley | | G06K 9/00711 |
| 9,542,753 B2* | 1/2017 | Mai | | G06T 7/246 |
| 10,217,120 B1* | 2/2019 | Shin | | G06Q 10/06393 |
| 10,223,595 B2* | 3/2019 | Citerin | | G06K 9/6201 |
| 10,750,155 B2* | 8/2020 | Karvounis | | G06T 7/277 |
| 10,769,808 B2* | 9/2020 | Long | | G06T 7/70 |
| 2006/0279630 A1* | 12/2006 | Aggarwal | | G08B 13/19682 |
| | | | | 348/143 |
| 2008/0130949 A1* | 6/2008 | Ivanov | | G06K 9/00771 |
| | | | | 382/103 |
| 2008/0170120 A1* | 7/2008 | Senior | | H04N 7/183 |
| | | | | 348/143 |
| 2008/0192116 A1* | 8/2008 | Tamir | | G06T 7/292 |
| | | | | 348/157 |
| 2010/0013931 A1* | 1/2010 | Golan | | G06T 7/70 |
| | | | | 348/150 |
| 2010/0134627 A1* | 6/2010 | Yen | | G06T 7/292 |
| | | | | 348/159 |
| 2010/0157064 A1* | 6/2010 | Cheng | | H04N 5/247 |
| | | | | 348/169 |
| 2013/0050502 A1* | 2/2013 | Saito | | G06T 7/20 |
| | | | | 348/169 |
| 2017/0177947 A1* | 6/2017 | Citerin | | G06T 7/292 |
| 2017/0228747 A1* | 8/2017 | Prandoni | | G06F 16/51 |
| 2019/0122064 A1* | 4/2019 | Ishikawa | | G06K 9/3241 |
| 2019/0279024 A1* | 9/2019 | Martinello | | G06K 9/4671 |

* cited by examiner

DISTRIBUTED OBJECT TRACKING SYSTEM

CROSS-REFERENCES TO RELATED APPLICATIONS

This application claims the priority of Taiwan application No. 107115293 filed May 4, 2018, the disclosure of which is incorporated herein in its entirety by reference.

BACKGROUND OF THE INVENTION

I. Field of the Invention

The present invention relates to an object tracking system, and more particularly, to a distributed object tracking system.

II. Description of Related Art

Conventionally, each image analysis devices perform image analysis based on a single video stream inputted from a single camera, wherein each image analysis device generates an analysis result of an object in the video stream independently; therefore it is difficult to concatenate the analysis results of the image analysis devices for tracking the object. As such, the industry needs a better solution to resolve the above issue.

SUMMARY OF THE INVENTION

In one embodiment of the present invention, a distributed object tracking system is provided, wherein the distributed object tracking system comprises: a plurality of image analysis devices and a cluster management service device connected to the plurality of image analysis devices, wherein each image analysis device analyzes an object in a corresponding real-time video stream to generate an analysis result for tracking the object, and the cluster management service device includes a tracking module to form a trajectory of the object according to the analysis result generated by each of the plurality of image analysis devices.

In one embodiment of the present invention, a distributed object tracking system is provided, wherein the distributed object tracking system comprises: a plurality of image analysis devices, wherein each of the plurality of image analysis devices is connected to at least one corresponding camera device to analyze an object in at least one corresponding real-time video stream transmitted by the at least one corresponding camera device so as to generate analysis results of said object; and a cluster management service device, connected to the plurality of image analysis devices, wherein the cluster management service device concatenates the analysis results of said object generated by each of the plurality of image analysis devices for generating a trajectory of said object.

In one embodiment, each of the plurality of image analysis devices is connected to a plurality of corresponding camera devices to analyze an object in a plurality of corresponding real-time video streams transmitted by the plurality of corresponding camera devices so as to generate the analysis results of said object.

In one embodiment, the plurality of image analysis devices are distributed in a detection region, wherein when a particular object is not detected in the detection region for more than a predetermined length of time, the plurality of image analysis devices stop tracking said particular object.

In one embodiment, the plurality of image analysis devices are distributed in a detection region, wherein when a particular object stays in a specific area within the detection region for more than a predetermined length of time, an alarm will be generated by the distributed object tracking system.

In order to make the aforementioned and other features and advantages of the present invention more comprehensible, several embodiments accompanied with drawings are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

The foregoing as well as other technical contents, features, and effects of the present invention will be clearly apparent from the following detailed description with reference to the preferred embodiments of the drawings. However, it should be noted that the following embodiments are not intended to limit the present invention.

Figure 1:
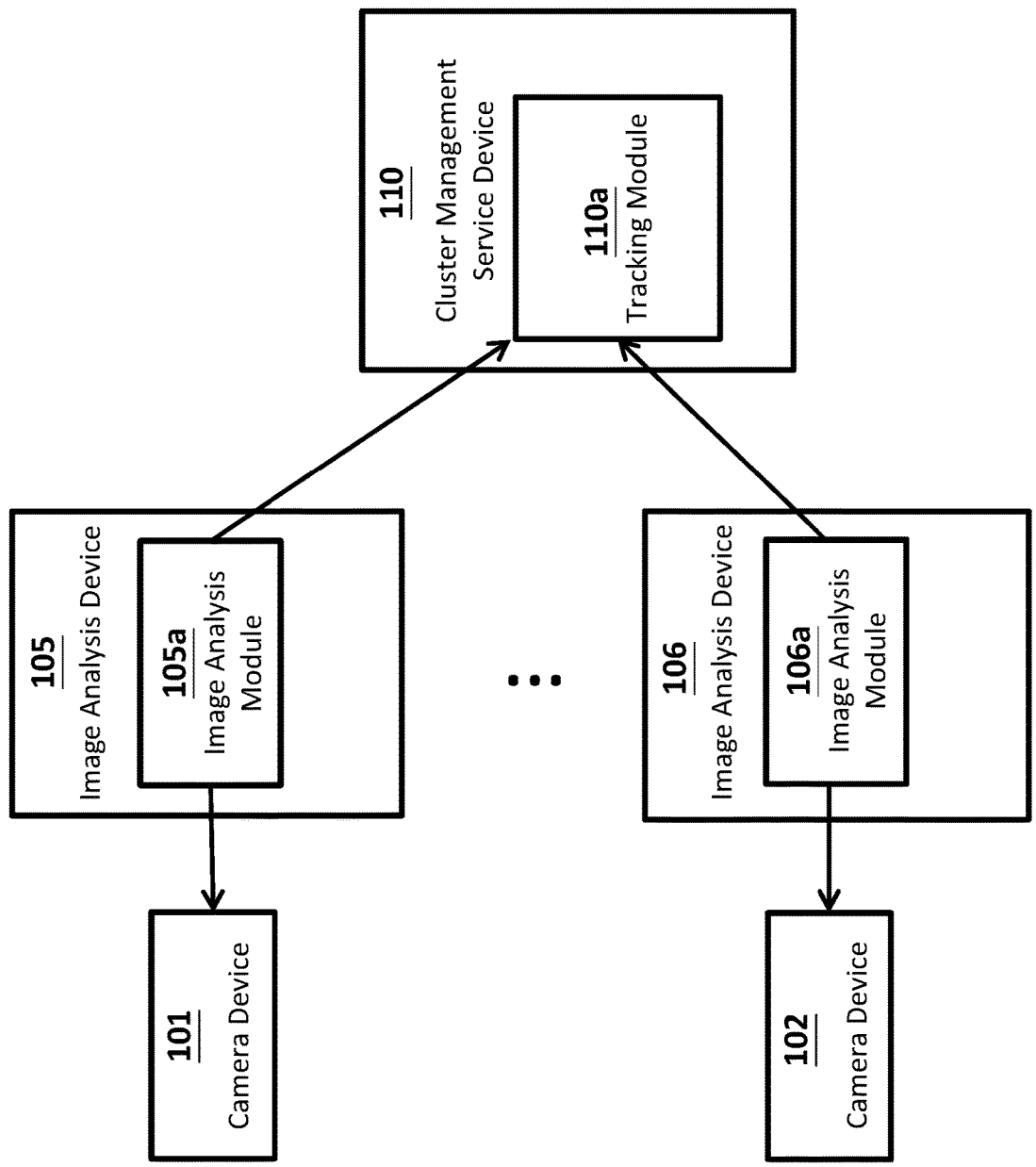
FIG. 1 illustrates a schematic diagram of a distributed object tracking system in accordance with one embodiment of the present invention.

FIG. 1 illustrates a distributed object tracking system in accordance with one embodiment of the present invention. Please refer to FIG. 1, wherein the distributed object tracking system comprises a plurality of image analysis devices 105, 106, wherein each of the image analysis devices 105, 106 comprises a corresponding image analyses module 105a, 105b to analyzes an object in a corresponding real-time video stream captured by camera devices 101 and 102 to generate a corresponding analysis results of the object; and a cluster management service device connected to the plurality of image analysis devices 105, 106, wherein the cluster management service device 110 comprises a tracking module 110a for concatenating the analysis results of the object generated by the plurality of image analysis devices 105, 106 so as to generate a trajectory of the object.

In one embodiment, each of the plurality of image analysis devices is connected to a plurality of camera devices to analyze the object in a plurality of real-time video stream transmitted by the plurality of camera devices so as to generate the analysis results of the object.

In one embodiment, each of the plurality of image analysis devices is connected to a plurality of camera devices to analyze the object in a plurality of real-time video stream transmitted by the plurality of corresponding camera devices so as to generate a sub-trajectory of said object, wherein the cluster management service device concatenates the sub-trajectory of the object generated by each of the plurality of image analysis devices so as to generate a trajectory of the object.

In one embodiment, the object comprises a person, and the analysis results comprise the facial features of the person.

In one embodiment, the object comprises a suitcase, wherein the analysis results comprise characteristics of the suitcase.

In one embodiment, the plurality of image analysis devices are distributed in a detection region, wherein a particular object in the detection region is pre-determined not to be tracked.

In one embodiment, the detection region comprises a station, wherein the station personnel is pre-determined not to be tracked.

Figure 2:
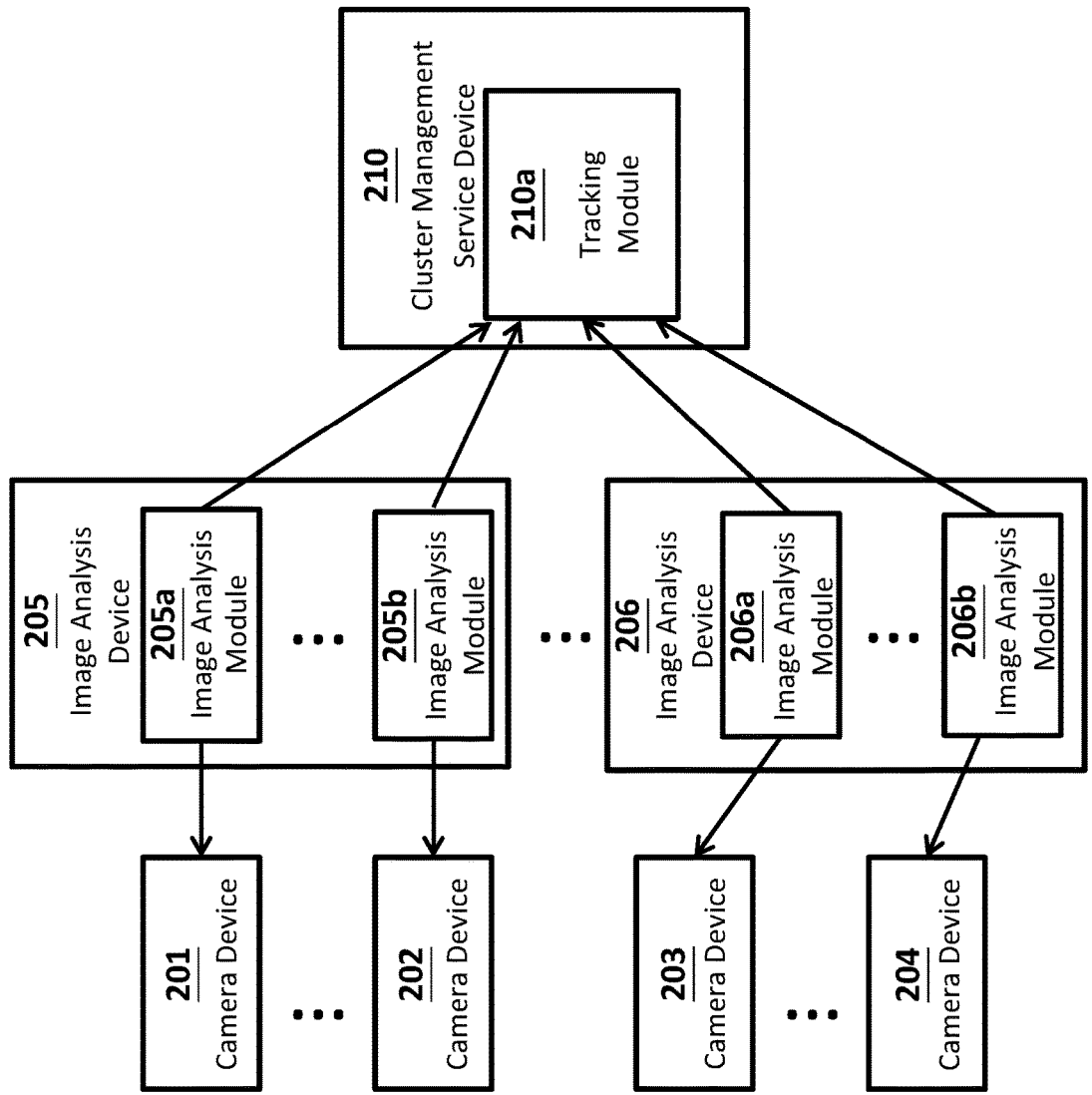
FIG. 2 illustrates a schematic diagram of a distributed object tracking system in accordance with one embodiment of the present invention.

FIG. 2 illustrates a distributed object tracking system in accordance with one embodiment of the present invention. Please refer to FIG. 2. The distributed object tracking system comprises a plurality of image analysis devices 205, 206, wherein each of the image analysis device 205, 206 is connected to a plurality of corresponding camera devices 201, 202, 203, 204 and comprises a plurality of corresponding image analysis modules 205a, 205b, 206a, 206b to analyze an object in the corresponding real-time video streams captured by the plurality of camera devices 201, 202, 203, 204 so as to generate a corresponding analyses result of the object; and a cluster management service device 210 connected to the plurality of image analysis devices 205, 206, wherein the cluster management service device 210 comprises a tracking module 210a for concatenating the analyses results generated by the plurality of image analysis devices 205, 206 so as to generate a trajectory of the object.

Figure 3:
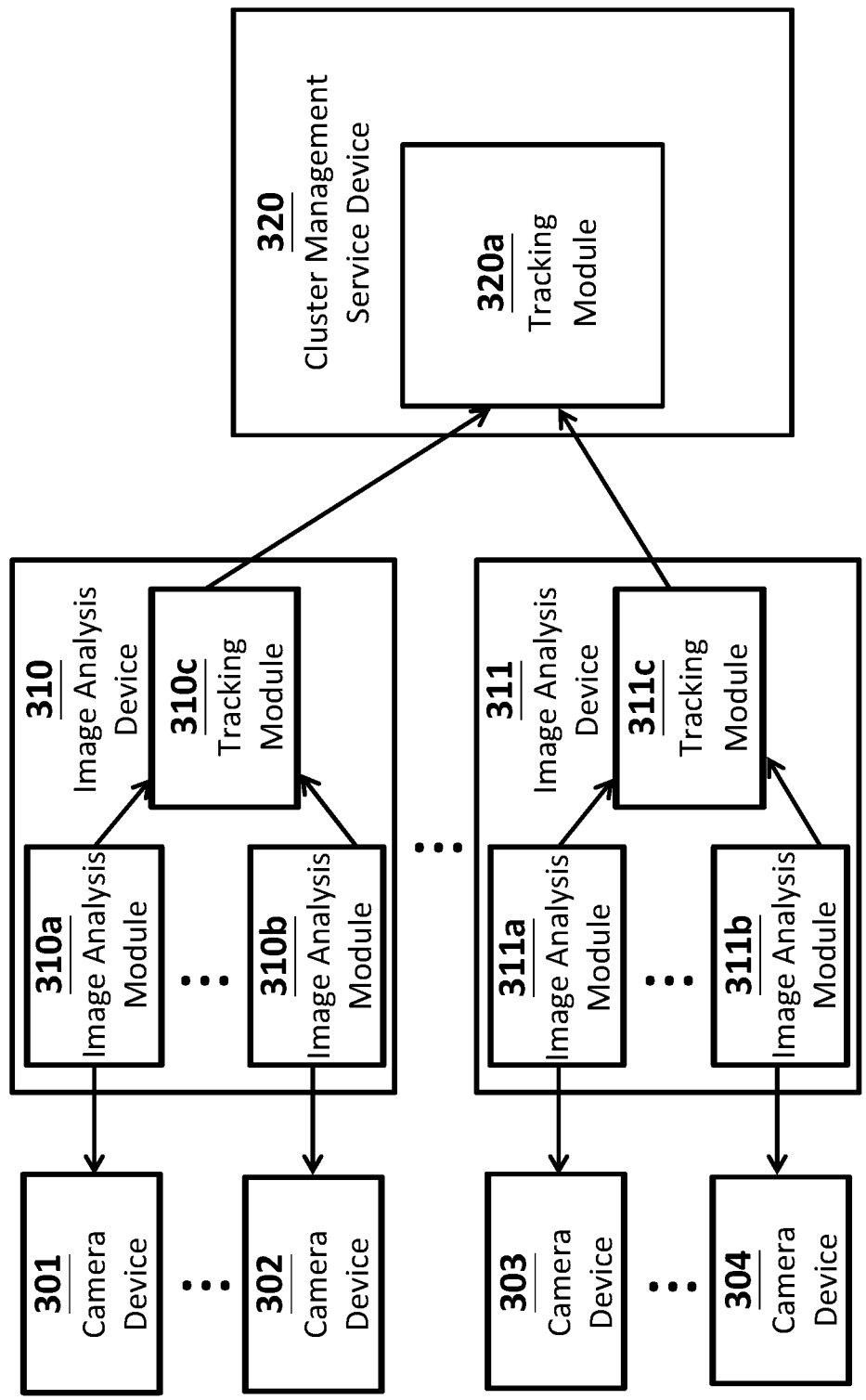
FIG. 3 illustrates a schematic diagram of a distributed object tracking system in accordance with one embodiment of the present invention.

FIG. 3 illustrates a distributed object tracking system in accordance with one embodiment of the present invention. Please refer to FIG. 3, wherein the distributed object tracking system comprises a plurality of image analysis devices 310, 311, wherein the image analysis devices 310, 311 comprises a plurality of image analysis modules 310a, 310b, 311a, and 311b to analyze an object in corresponding real-time video streams captured by the camera devices 301, 302, 303, and 304, wherein each of the image analysis devices 310, 311 comprises a tracking module 310c, 311c to concatenate the analysis results of the object so as to generate a corresponding sub-trajectory of the object; and a cluster management service device 320 connected to the plurality of image analysis devices 310, 311, wherein the cluster management service device 320 comprises a tracking module 320a for concatenating the sub-trajectories of the object generated by the plurality of image analysis devices 310, 311 so as to generate a trajectory of the object.

In one embodiment, the distributed object tracking system can be divided into multiple detection regions. In one embodiment, each image analysis device can perform face detection or other non-human object detection in real-time. In one embodiment, objects that do not need to be tracked can be excluded. For example, at a station, it is possible to specify or identify station personnel that shall not to be tracked. It is also possible to specify a particular object that needs to be tracked, such as a suitcase.

In one embodiment, when a particular object in the detection region is not detected for more than a predetermined length of time, the plurality of image analysis devices will no longer track the particular object.

In one embodiment when a particular object continues to stay in a specific region for more than a predetermined length of time, an alarm can be generated.

Figure 4:
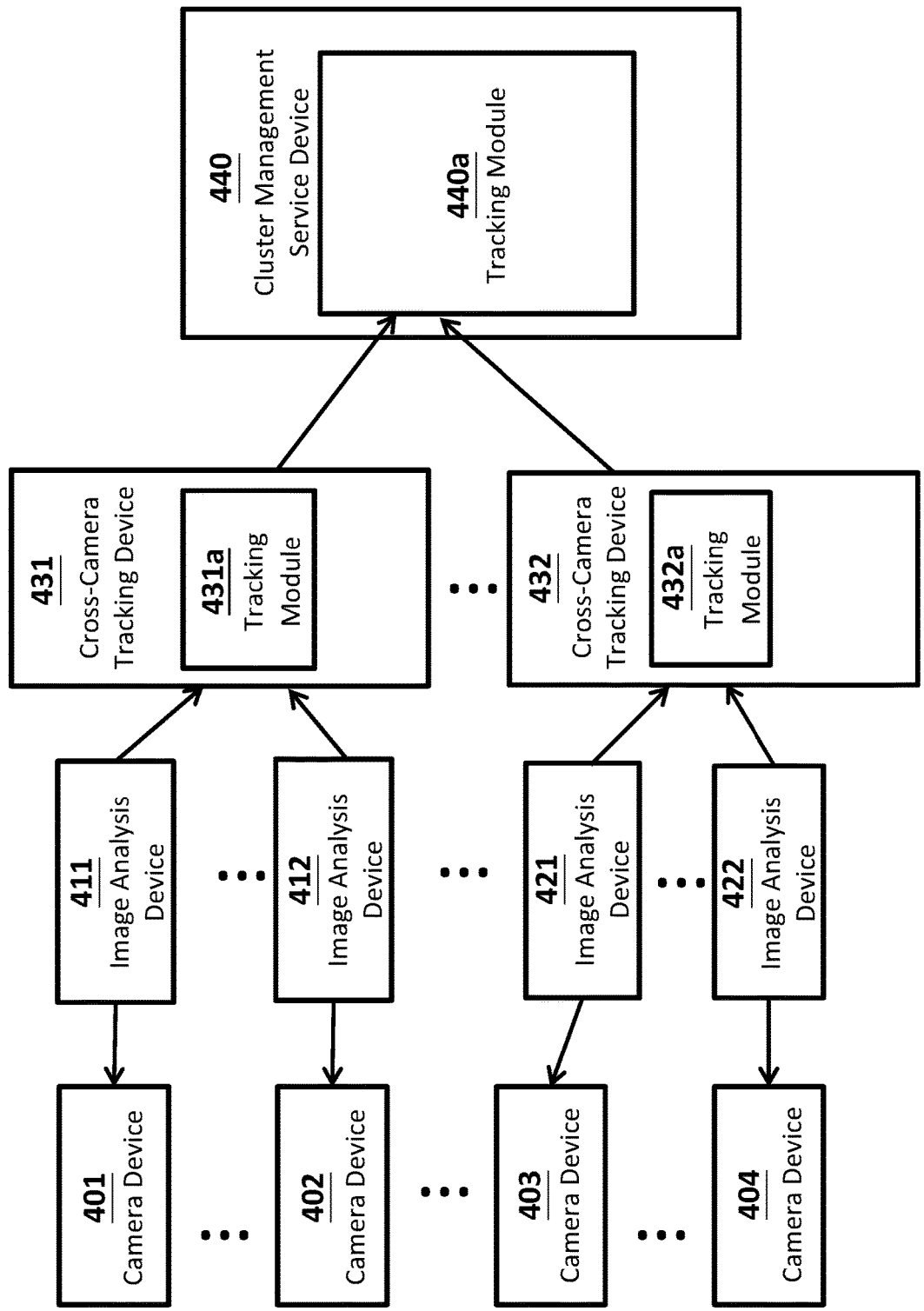
FIG. 4 illustrates a schematic diagram of a distributed object tracking system in accordance with one embodiment of the present invention.

FIG. 4 illustrates a distributed object tracking system in accordance with one embodiment of the present invention. Please refer to FIG. 4, wherein the distributed object tracking system comprises: a first plurality of image analysis devices 411, 412, wherein each of the image analysis devices 411, 412 analyzes an object in corresponding real-time video streams captured by the plurality of camera devices 401, 402 so as to generate a first analysis result of the object; a first cross-camera tracking device 431 connected to the first plurality of image analysis devices 411, 412, wherein the first cross-camera tracking device 431 comprises a tracking module 431a for concatenating the first analysis result of the object generated by each of the first plurality of image analysis devices 411, 412 so as to generate a first sub-trajectory of the object; a second plurality of image analysis devices 421, 422, wherein each of the second image analysis devices 421, 422 analyzes the object in corresponding real-time video streams captured by the plurality of camera devices 403, 404 so as to generate a second analysis result of the object; a second cross-camera tracking device 432 connected to the second plurality of image analysis devices 421, 422, wherein the second cross-camera tracking device 432 comprises a tracking module 432a for concatenating the second analysis result of the object generated by each of the second plurality of image analysis devices 421, 422 so as to generate a second sub-trajectory of the object; and a cluster management service device 440 connected to the first cross-camera tracking device 431 and the second cross-camera tracking device 432, wherein the cluster management service device 440 comprises a tracking module 440a for concatenating the first sub-trajectory and the second sub-trajectory for generating of a trajectory of the object.

Please note that each of the image analysis devices 411, 412, 421 and 422 in FIG. 4 may replace the image analysis device in FIG. 1, FIG. 2, or FIG. 3.

In one embodiment, the distributed object tracking system tracks an object based an inputted image of the object.

In one embodiment, each of the plurality of image analysis devices is connected to a plurality of camera devices to analyze the object.

In one embodiment, the first plurality of image analysis devices are distributed in a first detection region, and the second plurality of image analysis devices are distributed in a second detection region, wherein at least one particular object within the first and the second detection regions is predetermined not to be tracked.

In one embodiment, the first plurality of image analysis devices are distributed in a first detection region, and the second plurality of image analysis devices are distributed in a second detection region, wherein when a particular object is not detected in the first detection region and the second detection region for more than a predetermined length of time, the first plurality of image analysis devices and the second plurality of image analysis devices stop tracking said particular object.

In one embodiment, the first plurality of image analysis devices are distributed in a first detection region, and the second plurality of image analysis devices are distributed in a second detection region, wherein when a particular object stays in a specific region within the first detection region or the second detection region for more than a predetermined length of time, an alarm is generated by the distributed object tracking system.

The cluster management device of the present invention can have an Internet address, such as a fixed Internet address, for communicating with the plurality of image analysis devices via the Internet, wherein the cluster management device and the plurality of image analysis devices can communicate with each other by using a communication protocol. The cluster management device can have a management interface for a user to manage the plurality of image analysis devices. In one embodiment, the management interface can display a distribution map of the locations of the plurality of image analysis devices on a screen. In one embodiment, the management interface allows for inputting an image of an object for tracking the object.

In one embodiment, the distributed object tracking system of the present invention can track objects in real time and can inform an authority if there is any suspicious object found within a detected region.

In one embodiment, the image analysis device of the present invention can control the lens of a PTZ camera for tracking an object, wherein the PTZ camera can rotate left and right (Pan), up and down (Tile) and zoom (Zoom).

In one embodiment, the cluster management device has image analysis capabilities.

In one embodiment, the cluster management device can be integrated with an image analysis device to lower system cost.

In one embodiment, the cluster management device does not have image analysis capabilities.

In one embodiment, the tracking module of the image analysis device of the present invention includes at least one central processing unit (CPU).

In one embodiment, the tracking module of the image analysis device of the present invention includes at least one CPU and at least one graphics processing unit (GPU) or an image processing hardware accelerator.

In one embodiment, the tracking module of the image analysis device of the present invention includes at least one CPU and an image processing hardware accelerator.

While the invention has been described in connection with the preferred embodiments, it is not intended to limit the scope of the invention. Any person skilled in the art can make some changes and modifications without departing from the spirit and scope of the present invention. The scope of the patent protection of the invention hence shall be subject to the definition of the scope of the patent application attached hereto.

What is claimed is:

1. A distributed object tracking system, comprising:
   a plurality of image analysis devices, wherein each of the plurality of image analysis devices is connected to a plurality of corresponding camera devices to analyze an object in each of a plurality of corresponding real-time video streams transmitted by the plurality of corresponding camera devices so as to generate an analysis result of the object for each of the plurality of corresponding real-time video streams, respectively, wherein each of the plurality of image analysis devices concatenates the analysis results of the object to generate a corresponding sub-trajectory of the object in the plurality of corresponding real-time video streams, respectively; and
   a cluster management service device, connected to the plurality of image analysis devices, wherein the cluster management service device concatenates the sub-trajectories of the object generated by the plurality of image analysis devices for generating a trajectory of the object.

2. The distributed object tracking system according to claim 1, wherein the object is a person, wherein the analysis result comprise facial features of the person.

3. The distributed object tracking system according to claim 1, wherein the object is a suitcase, wherein the analysis results comprise characteristics of the suitcase.

4. The distributed object tracking system according to claim 1, wherein the plurality of image analysis devices are distributed in a detection region, wherein a particular object in the detection region is predetermined not to be tracked.

5. The distributed object tracking system according to claim 1, wherein the plurality of image analysis devices are distributed in a detection region, wherein the detection region comprises a station, wherein a member of the train station or airport personnel is predetermined not to be tracked.

6. The distributed object tracking system according to claim 1, wherein the plurality of image analysis devices are distributed in a detection region, wherein when a particular object is not detected in the detection region for more than a predetermined length of time, the plurality of image analysis devices stop tracking said particular object.

7. The distributed object tracking system according to claim 1, wherein the plurality of image analysis devices are distributed in a detection region, wherein when a particular object stays in a specific area within the detection region for more than a predetermined length of time, an alarm is generated by the distributed object tracking system.

8. A distributed object tracking system, comprising:
   a first plurality of image analysis devices, wherein each of the first plurality of image analysis devices is connected to at least one first corresponding camera device to analyze an object in at least one first corresponding real-time video stream transmitted by the at least one first corresponding camera device so as to generate a first analysis result of the object;
   a second plurality of image analysis devices, wherein each of the second plurality of image analysis devices is connected to at least one second corresponding camera device to analyze the object in at least one second corresponding real-time video stream transmitted by the at least one second corresponding camera device so as to generate a second analysis result of the object;
   a first cross-camera tracking device, connected to the first plurality of image analysis devices, wherein the first cross-camera tracking device concatenates the first analysis result of the object generated by each of the first plurality of image analysis devices so as to generate a first sub-trajectory of the object;
   a second cross-camera tracking device, connected to the second plurality of image analysis devices, wherein the second cross-camera tracking device concatenates the second analysis result of the object generated by each of the second plurality of image analysis devices so as to generate a second sub-trajectory of the object; and
   a cluster management service device, connected to the first cross-camera tracking device and the second cross-camera tracking device, wherein the cluster management service device concatenates the first sub-trajectory and the second sub-trajectory of the object for generating a trajectory of the object.

9. The distributed object tracking system according to claim 8, wherein each of the plurality of image analysis devices is connected to a plurality of corresponding camera devices to analyze the object.

10. The distributed object tracking system according to claim 8, wherein the distributed object tracking system tracks the object based on an inputted image of the object.

11. The distributed object tracking system according to claim 8, wherein the first plurality of image analysis devices are distributed in a first detection region, and the second plurality of image analysis devices are distributed in a second detection region, wherein a particular object within the first and the second detection regions is predetermined not to be tracked.

12. The distributed object tracking system according to claim 8, wherein the first plurality of image analysis devices are distributed in a first detection region, and the second plurality of image analysis devices are distributed in a second detection region, wherein when a particular object is not detected in the first detection region and the second detection region for more than a predetermined length of time, the first plurality of image analysis devices and the second plurality of image analysis devices stop tracking said particular object.

13. The distributed object tracking system according to claim 8, wherein the first plurality of image analysis devices are distributed in a first detection region, and the second plurality of image analysis devices are distributed in a second detection region, wherein when a particular object stays in a specific region for more than a predetermined length of time, an alarm is generated by the distributed object tracking system.

* * * * *